United States Patent
Sanders

(10) Patent No.: US 11,254,620 B2
(45) Date of Patent: Feb. 22, 2022

(54) MICRONUTRIENT-ENHANCED POLYMERIC SEED COATINGS

(71) Applicant: Verdesian Life Sciences, LLC, Cary, NC (US)

(72) Inventor: John Larry Sanders, Leawood, KS (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 1057 days.

(21) Appl. No.: 14/447,858

(22) Filed: Jul. 31, 2014

(65) Prior Publication Data

US 2015/0033811 A1 Feb. 5, 2015

Related U.S. Application Data

(60) Provisional application No. 62/001,370, filed on May 21, 2014, provisional application No. 61/862,301, filed on Aug. 5, 2013.

(51) Int. Cl.
| | |
|---|---|
| C05D 9/02 | (2006.01) |
| A01C 1/06 | (2006.01) |
| C05G 3/80 | (2020.01) |
| C05G 5/30 | (2020.01) |
| C08F 222/02 | (2006.01) |

(52) U.S. Cl.
CPC ............. *C05D 9/02* (2013.01); *C05G 3/80* (2020.02); *C05G 5/37* (2020.02); *C08F 222/02* (2013.01)

(58) Field of Classification Search
None
See application file for complete search history.

(56) References Cited

U.S. PATENT DOCUMENTS

| | | |
|---|---|---|
| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |
| 4,010,006 A | 3/1977 | Price |
| 4,071,400 A | 1/1978 | Jankowiak |
| 4,076,663 A | 2/1978 | Masuda et al. |
| 4,082,533 A | 4/1978 | Wittenbrook et al. |
| 4,083,835 A | 4/1978 | Pohlemann et al. |
| 4,135,887 A | 1/1979 | Rossi |
| 4,161,539 A | 7/1979 | Stallcup |
| 4,165,743 A | 8/1979 | Denning |
| 4,173,669 A | 11/1979 | Ashida et al. |
| 4,211,765 A | 7/1980 | Johnson et al. |
| 4,251,255 A | 2/1981 | Wagner et al. |
| 4,434,231 A | 2/1984 | Jung |
| 4,439,488 A | 3/1984 | Trimnell et al. |
| 4,451,628 A | 5/1984 | Dammann |
| 4,471,100 A | 9/1984 | Tsubakimoto et al. |
| 4,538,532 A | 9/1985 | Coker |
| 4,652,273 A | 3/1987 | Maldonado et al. |
| 4,663,408 A | 5/1987 | Schulz et al. |

(Continued)

FOREIGN PATENT DOCUMENTS

| | | |
|---|---|---|
| CN | 1044025 A | 7/1990 |
| CN | 1149239 A | 5/1997 |

(Continued)

OTHER PUBLICATIONS

Chemistry Corner; "Sulfonated polymers: Simple chemistry for high-tech materials & applications" Speciality Chemicals Magazine, Feb. 25, 13, no pagination; file:///C:/Users/ehirt/Downloads/Sulfonated%20polymers%20Simple%20chemistry%20for%20high-tech%20materials%20&%20applications%20(1).pdf (Year: 2013).*
MSU Extension http://landresources.montana.edu/nm/documents/NM9.pdf, p. 2-16. (Year: 2011).*
Agrotain International LLC White Paper: Maleic-Itaconic Copolymer; available online at talk.newagtalk.com/forums/get-attachment.asp?attachmentid=42697; downloaded Feb. 1, 2017.
AVAIL MSDS dated Jan. 16, 2012.

(Continued)

*Primary Examiner* — Erin E Hirt
(74) *Attorney, Agent, or Firm* — Katten Munchin Rosenman LLP

(57) ABSTRACT

Improved, micronutrient-supplemented polymeric seed coatings are provided which include at least one polyanionic polymer in combination with respective amounts of Zn, Mn, and Cu micronutrients. Preferably, the coatings comprise polyanionic polymers having a backbone comprising dicarboxylic repeat units with Zn, Mn, and Cu bound to the backbone. The most preferred polymers contain maleic and itaconic repeat units, optionally with sulfonate repeat units. The invention also provides a method of treating seeds using the coatings, and coated seed products.

31 Claims, No Drawings

(56) References Cited

U.S. PATENT DOCUMENTS

| | | | |
|---|---|---|---|
| 4,701,204 A | 10/1987 | Duvdevani et al. |
| 4,709,091 A | 11/1987 | Fukumoto et al. |
| 4,725,655 A | 2/1988 | Denzinger et al. |
| 4,808,215 A | 2/1989 | Gill et al. |
| 4,844,725 A | 7/1989 | Malouf et al. |
| 4,872,412 A | 10/1989 | Zollinger |
| 4,897,220 A | 1/1990 | Trieselt et al. |
| 4,923,500 A | 5/1990 | Sylling |
| 4,929,690 A | 5/1990 | Goertz et al. |
| 4,933,098 A | 6/1990 | Gutierrez et al. |
| 4,936,897 A | 6/1990 | Pipko et al. |
| 4,952,415 A | 8/1990 | Winowiski et al. |
| 5,013,769 A | 5/1991 | Murray et al. |
| 5,024,676 A | 6/1991 | Moriyama et al. |
| 5,035,821 A | 7/1991 | Chung et al. |
| 5,047,078 A | 9/1991 | Gill |
| 5,054,434 A | 10/1991 | Wax et al. |
| 5,064,563 A | 11/1991 | Yamaguchi et al. |
| 5,106,648 A | 4/1992 | Williams |
| 5,113,619 A | 5/1992 | Leps et al. |
| 5,135,677 A | 8/1992 | Yamaguchi et al. |
| 5,188,654 A | 2/1993 | Manalastas et al. |
| 5,194,263 A | 3/1993 | Chamberlain et al. |
| 5,210,163 A | 5/1993 | Grey |
| 5,223,592 A | 6/1993 | Hughes et al. |
| 5,256,181 A | 10/1993 | Manalastas et al. |
| 5,294,651 A | 3/1994 | Stephens |
| 5,300,127 A | 4/1994 | Williams |
| 5,328,624 A | 7/1994 | Chung |
| 5,336,727 A | 8/1994 | Okazawa et al. |
| 5,391,632 A | 2/1995 | Krull et al. |
| 5,399,639 A | 3/1995 | Kimpton et al. |
| 5,427,785 A | 6/1995 | Ronson et al. |
| 5,435,821 A | 7/1995 | Duvdevani et al. |
| 5,536,311 A | 7/1996 | Rodrigues |
| 5,562,916 A | 10/1996 | Van Ooijen |
| 5,574,004 A | 11/1996 | Carr |
| 5,578,486 A | 11/1996 | Zhang |
| 5,597,400 A | 1/1997 | Nonomura et al. |
| 5,653,782 A | 8/1997 | Stern et al. |
| 5,666,905 A | 9/1997 | Mackin et al. |
| 5,681,678 A | 10/1997 | Nealey et al. |
| 5,688,907 A | 11/1997 | Wood et al. |
| 5,697,186 A | 12/1997 | Neyra et al. |
| 5,732,658 A | 3/1998 | Wolters et al. |
| 5,741,521 A | 4/1998 | Knight et al. |
| 5,760,150 A | 6/1998 | Bachus |
| 5,788,722 A | 8/1998 | Emert et al. |
| 5,916,029 A | 6/1999 | Smith et al. |
| 5,993,666 A | 11/1999 | Yamaguchi et al. |
| 5,994,265 A | 11/1999 | Barclay et al. |
| 5,997,602 A | 12/1999 | Aijala |
| 6,022,555 A | 2/2000 | DeLuca et al. |
| 6,057,398 A | 5/2000 | Blum |
| 6,100,221 A | 8/2000 | Poelker et al. |
| 6,100,224 A | 8/2000 | Peiffer et al. |
| 6,139,596 A | 10/2000 | Barth et al. |
| 6,180,589 B1 | 1/2001 | Rodrigues et al. |
| 6,187,074 B1 | 2/2001 | von Locquenghien et al. |
| 6,199,318 B1 | 3/2001 | Stewart et al. |
| 6,207,780 B1 | 3/2001 | Stockhausen et al. |
| 6,221,956 B1 | 4/2001 | Chen |
| 6,228,806 B1 | 5/2001 | Mehta |
| 6,271,191 B1 | 8/2001 | Kerobo et al. |
| 6,287,359 B1 | 9/2001 | Erhardt et al. |
| 6,309,439 B1 | 10/2001 | von Locquenghien et al. |
| 6,312,493 B1 | 11/2001 | Eltink et al. |
| 6,384,166 B1 | 5/2002 | Austin et al. |
| 6,395,051 B1 | 5/2002 | Arnold et al. |
| 6,413,292 B1 | 7/2002 | von Locquengh et al. |
| 6,444,771 B1 | 9/2002 | Yamaguchi et al. |
| 6,471,741 B1 | 10/2002 | Reinbergen |
| 6,488,734 B1 | 12/2002 | Barth et al. |
| 6,500,223 B1 | 12/2002 | Sakai et al. |
| 6,515,090 B1 | 2/2003 | Sanders et al. |
| 6,515,091 B2 | 2/2003 | Sanders et al. |
| 6,544,313 B2 | 4/2003 | Peacock et al. |
| 6,569,976 B2 | 5/2003 | Baxter et al. |
| 6,586,560 B1 | 7/2003 | Chen et al. |
| 6,632,262 B2 | 10/2003 | Gabrielsen |
| 6,635,702 B1 | 10/2003 | Schmucker-Castner et al. |
| 6,653,428 B1 | 11/2003 | Klein et al. |
| 6,703,469 B2 | 3/2004 | Sanders et al. |
| 6,734,148 B2 | 5/2004 | Bell et al. |
| 6,770,616 B1 | 8/2004 | McGowan et al. |
| 6,843,846 B2 | 1/2005 | Chatterji et al. |
| 6,844,293 B1 | 1/2005 | Kirby et al. |
| 6,855,182 B2 | 2/2005 | Sears |
| 6,897,184 B2 | 5/2005 | Kurita et al. |
| 6,897,253 B2 | 5/2005 | Schmucker-Castner et al. |
| 6,930,139 B2 | 8/2005 | Sanders et al. |
| 6,936,598 B2 | 8/2005 | Khoo et al. |
| 7,004,991 B2 | 2/2006 | Narayanan et al. |
| 7,019,046 B2 | 3/2006 | Narayanan et al. |
| 7,071,259 B2 | 7/2006 | Botros |
| 7,071,275 B2 | 7/2006 | Rath et al. |
| 7,201,959 B2 | 4/2007 | Judek et al. |
| 7,217,752 B2 | 5/2007 | Schmucker-Castner et al. |
| 7,317,062 B2 | 1/2008 | Pritschins et al. |
| 7,470,304 B2 | 12/2008 | Keenan et al. |
| 7,537,705 B2 | 5/2009 | Mizuno et al. |
| 7,572,328 B2 | 8/2009 | Lettkeman et al. |
| 7,615,521 B2 | 11/2009 | Eveland et al. |
| 7,655,597 B1 | 2/2010 | Sanders |
| 7,666,241 B2 | 2/2010 | Sanders et al. |
| 7,686,863 B1 | 3/2010 | Sanders |
| 7,695,541 B1 | 4/2010 | Frizzell et al. |
| 7,923,479 B2 | 4/2011 | Champ et al. |
| 7,942,941 B2 | 5/2011 | Cravey et al. |
| 8,025,709 B2 | 9/2011 | Sanders et al. |
| 8,043,995 B2 | 10/2011 | Sanders et al. |
| 8,048,190 B2 * | 11/2011 | Valencia .................. C05D 9/02 71/28 |
| 8,097,076 B2 | 1/2012 | Göbelt et al. |
| 8,110,017 B2 | 2/2012 | Wells |
| 8,143,333 B2 | 3/2012 | Peppmoller et al. |
| 8,163,859 B2 | 4/2012 | Jeon et al. |
| 8,182,593 B2 | 5/2012 | Rapp |
| 8,192,520 B2 | 6/2012 | Sanders |
| 8,420,758 B2 | 4/2013 | Durant et al. |
| 8,430,943 B2 | 4/2013 | Sanders |
| 8,436,072 B2 | 5/2013 | Herth et al. |
| 8,491,693 B2 | 7/2013 | Burnham |
| 8,562,710 B2 | 10/2013 | Palmer et al. |
| 8,592,343 B2 | 11/2013 | Xavier et al. |
| 8,846,817 B2 | 9/2014 | Yontz et al. |
| 9,139,481 B2 | 9/2015 | Sanders |
| 9,145,340 B2 | 9/2015 | Sanders |
| 2001/0002390 A1 | 5/2001 | Rodrigues |
| 2001/0029762 A1 | 10/2001 | Steele et al. |
| 2002/0010296 A1 | 1/2002 | Baxter et al. |
| 2002/0049139 A1 | 4/2002 | Smale |
| 2002/0132886 A1 | 9/2002 | Meffert et al. |
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |
| 2006/0078526 A1 | 4/2006 | Boyd et al. |
| 2006/0191851 A1 | 8/2006 | Mizuno et al. |
| 2006/0234901 A1 | 10/2006 | Scheuing et al. |
| 2007/0027281 A1 | 2/2007 | Michl et al. |
| 2007/0161524 A1 | 7/2007 | Counradi et al. |
| 2007/0212320 A1 | 9/2007 | Demitz et al. |

(56) References Cited

U.S. PATENT DOCUMENTS

| | | |
|---|---|---|
| 2007/0213243 A1 | 9/2007 | Yao et al. |
| 2007/0218168 A1 | 9/2007 | Hale, III |
| 2008/0044548 A1 | 2/2008 | Hale, III |
| 2008/0189085 A1 | 8/2008 | Cook et al. |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0258953 A1* | 10/2009 | Dobrawa ............... A61P 43/00 514/772.6 |
| 2009/0270257 A1 | 10/2009 | Pursell et al. |
| 2009/0298902 A1* | 12/2009 | Taranta ................. A01N 25/10 514/407 |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | |
|---|---|---|
| CN | 1962565 A | 5/2007 |
| CN | 101423431 A | 5/2009 |
| CN | 101519324 A | 9/2009 |
| CN | 101575243 A | 11/2009 |
| CN | 101580409 | 11/2009 |
| CN | 101792348 A | 8/2010 |
| CN | 101830571 A | 9/2010 |
| CN | 101885798 A | 11/2010 |
| CN | 101885888 A | 11/2010 |
| CN | 102154013 A | 8/2011 |
| DE | 2558551 A1 | 7/1977 |
| DE | 2822488 A1 | 11/1979 |
| DE | 4122490 A1 | 1/1993 |
| DE | 4132620 A1 | 4/1993 |
| EP | 0290807 A2 | 11/1988 |
| EP | 0314070 A2 | 5/1989 |
| EP | 0337694 A2 | 10/1989 |
| EP | 0683985 A1 | 11/1995 |
| EP | 0877076 A2 | 11/1998 |
| EP | 0892111 A1 | 1/1999 |
| EP | 0976699 A1 | 2/2000 |
| EP | 1024692 A1 | 8/2000 |
| EP | 1230195 A1 | 8/2002 |
| EP | 2135854 A2 | 12/2009 |
| GB | 1324087 | 7/1973 |
| JP | 54050027 A | 4/1979 |
| JP | 54077294 A | 6/1979 |
| JP | S58131903 A | 8/1983 |
| JP | 60101194 A | 5/1985 |
| JP | 62096046 A | 5/1986 |
| JP | 61282301 A | 12/1986 |
| JP | 63083169 A | 4/1988 |
| JP | 63148937 A | 6/1988 |
| JP | 03112426 | 5/1991 |
| JP | H07215746 A | 8/1995 |
| JP | 08092591 A | 4/1996 |
| JP | 11092788 A | 4/1999 |
| JP | 2008023433 A | 2/2008 |
| RU | 2051884 C1 | 1/1996 |
| RU | 2378869 C1 | 1/2010 |
| WO | 9715367 A1 | 5/1997 |
| WO | 9918785 A1 | 4/1999 |
| WO | 9948833 A1 | 9/1999 |
| WO | 2006131213 A1 | 12/2006 |
| WO | 2007003388 A2 | 1/2007 |
| WO | 2009060012 A2 | 5/2009 |
| WO | 2009061930 A1 | 5/2009 |
| WO | 2015031521 A1 | 3/2015 |
| WO | 2015035031 A1 | 3/2015 |
| WO | 2015116716 A1 | 8/2015 |
| WO | 2015179552 A1 | 11/2015 |
| WO | 2015179687 A1 | 11/2015 |

OTHER PUBLICATIONS

Aziz, et al. *Efficiency of Slow Release Urea Fertilizer on Herb Yield and Essential Oil Production of Lemon Balm (Melissa Officinalis L.) Plant*. American-Eurasian J. Agric. & Environ. Sci., [Online] 5(2) :141-147, 2009.

Blair. Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure*. Efekat polimera na smanjenje emisije /Polj. tehn. (Jan. 2013), 1-13.

Chiba, Lee I. *Animal Nutrition Handbook, Section 12: Poultry Nutrition and Feeding*. pp. 316-331, 2009—available online at http://www.ag.auburn.edu/%7Echibale/an12poultryfeeding.pdf.

Chien et al. *Review of Maleic-Itaconic Acid Copolymer Purported as Urease Inhibitor and Phosphorus Enhancer in Soils.*. Agronomy Journal 106(2) : 423-430, 2014.

CN Search Report in Application No. 201080047969.4 received with First Office Action dated Jul. 31, 2013.

Davidson et al. *Persistence of Rhizobium japonicum on the Soybean Seed Coat Under Controlled Temperature and Humidity*. Applied and Environmental Microbiology, 35 : 94-96, 1978.

EP Search Report 1 dated Jun. 16, 2016 in related Application No. 13847267.5.

EP Search Report 2 dated Jun. 10, 2016 in related Application No. 16161777.4.

EP Search Report 3 dated Jun. 13, 2016 in related Application No. 16161780.8.

EP Search Report 4 dated Jul. 26, 2016 in related Application No. 16161783.2.

EP Search Report 5 dated Jun. 13, 2016 in related Application No. 16161786.5.

EP Search Report 6 dated Jun. 20, 2016 in related Application No. 16161785.7.

Gay, et al. *Ammonia Emissions and Animal Agriculture*. Virginia Cooperative Extension, Publication 442-110, Virginia Polytechnic Institute and State University, 2009.

(56) References Cited

OTHER PUBLICATIONS

*Grains/Fertilizers*, article found online at martinsachs.angelfire.com/feeding.html, dated Apr. 11, 2010.
Groenstein, C.M. et al. *Measures to Reduce Ammonia Emissions from Livestock Manures; Now, Soon, Later.* Wageningen UK Livestock Research; Report 488; Jun. 2011.
Herrington et al. *Rheological modification of bitumen with maleic anhydride and dicarboxylic acids.* Fuel, 78 : 101-110, 1999.
International Preliminary Report on Patentability 1 in corresponding application PCT/US 2014/052987, dated Mar. 10, 2016.
International Preliminary Report on Patentability 2 in related application PCT/US 2014/054069, dated Dec. 11, 2014.
International Search Report and Written Opinion 1 in related application PCT/US 2010/050244, dated Jun. 27, 2011.
International Search Report and Written Opinion 2 in related application PCT/US 2013/064378, dated Jan. 23, 2014 (Note: for cited reference RU2375063, see U.S. Pat. No. 6,936,598).
International Search Report and Written Opinion 3 in related application PCT/US 2013/054373, dated Dec. 12, 2013.
International Search Report and Written Opinion 4 in corresponding application PCT/US 2014/052987, dated Jan. 16, 2015.
International Search Report and Written Opinion 5 in related application PCT/US 2014/054069, dated Dec. 11, 2014.
International Search Report and Written Opinion 6 in related application PCT/US 2014/049451, dated Dec. 18, 2014.
International Search Report and Written Opinion 7 in related application PCT/US 2014/039424, dated Oct. 16, 2014.
International Search Report and Written Opinion 8 in related application PCT/US 2015/013345, dated Apr. 13, 2015.
International Search Report and Written Opinion 9 in related application PCT/US 2015/032037, dated Aug. 28, 2015.
International Search Report and Written Opinion 10 in related application PCT/US 2015/031823, dated Aug. 28, 2015.
Jung et al. *Polymer-entrapped rhizobium as an inoculants for legumes.* Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures.* Polymer 45 :5813-5828, 2004.
Kejun et al., *Copolymerization of cis-Butenedioic Acid with Sodium Methallylsulfonate in Aqueous Solution.* J. App. Poly. Sci., vol. 40 : 1529-1539; 1990.
Li et al. *Dispersion and Rheological Properties of Concentrated Kaolin Suspensions with Polycarboxylate Copolymers Bering Comb-like Side Chains.* Journal of the European Ceramic Society, 34(1) :137-146, Jan. 2014.
Machida et al. *Water Soluble Polymers, Ix. N-(2-chloroethyl)-sulfonamides of Styrene-maleic Acid and Styrene-itaconic Acid Copolymers.* Sen'i Gakkaishi 22(6) :269-73, 1996.

Mohan, Prasanthrajan et al. *Addressing the Challenges of Ammonia Loss from Poultry Droppings through Indigenous Carbon Wastes.* International Journal of Environmental Science and Development, 3 (4), Aug. 2012—available online at http://www.ijesd.org/papers/255-D590.pdf.
Naga et al. *Polymeric Additives for Pour Point Depression of Residual Fuel Oils.* J. Chem. Tech. Biotechnol. 35A : 241-247, 1985.
Patterson, Paul H. *Hen House Ammonia: Environmental Consequences and Dietary Strategies.* Multi-State Poultry Meeting, May 14-16, 2002—available online at http://www.ijesd.org/papers/255-D590.pdf.
Powers, Wendy. *Practices to Reduce Ammonia.* 2004—available online at http://www.thepoultrysite.com/articles/219/practices-to-reduce-ammonia.
Prochnow, L.I. et al. *Controlling Ammonia Losses During Manure Composting with the Addition of Phosphogypsum and Simple Superphosphate.* Sci.Agri., Piracicaba, 52(2) :346-349, mai/ago 1995.
Puoci et al. *Polymer in Agriculture: a Review.* American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils.* Can J Plan Sci [Online], pp. 785-788, 2002.
Shakkthivel et al. *Newly Developed Itaconic Acid Copolymers for Gypsum and Calcium Carbonate Scale Control.* Journal of Applied Polymer Science, 103(5) :3206-3213, 2007.
Singh, A. et al. *Efficacy of Urease Inhibitor to Reduce Ammonia Emission from Poultry Houses.* J. Appl. Poult. Res., 18 :34-42, 2009—available online at http://japr.fass.org/content/18/1/34.full.
*Sodium Lignosulphonate.* Available online at www.xyd-chem.com on Apr. 20, 2010.
US Provisional Patent Application entitled Polyanionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric.* Textile Research Journal, 69(10) :782-789, 1999.
Yang, Charles Q. et al. *In-situ Polymerization of Maleic Acid and Itaconic Acid on Cotton: MALDI/TOF Mass Spectroscopy and Light-Scattering Study.* Textile Research Journal, 70(4) :359-62, 2000.
Yanhe et al. *Synthesis and Performance of Itaconic Acid-Maleic Acid Copolymer.* .Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice.* J Plant Nutr [Online], 20(1): 79-91, 2007.
Zhang et al. *Synthesis and Inhibition Efficiency of a Novel Quadripolymer Inhibitor.* Chin. J. Ch. E. 15(4) :600; 2007.

\* cited by examiner

MICRONUTRIENT-ENHANCED POLYMERIC SEED COATINGS

CROSS-REFERENCE TO RELATED APPLICATIONS

This application claims the benefit of two provisional applications: identically titled application Ser. No. 62/001,370, filed May 21, 2014, and Ser. No. 61/862,301, filed Aug. 5, 2013, entitled MICRONUTRIENT-ENHANCED POLYMERIC WHEAT SEED COATINGS, both of which are incorporated herein by reference in their entireties.

BACKGROUND OF THE INVENTION

Field of the Invention

The present invention is concerned with polymers useful for coating of seeds (e.g., wheat and corn) in order to increase yields. More particularly, the invention is concerned with such polymers, and especially those containing maleic and itaconic moieties or repeat units, which are enhanced by the addition of certain micronutrients in specific amounts, and corresponding methods preparing and using such polymers.

Description of the Prior Art

Many factors influence the health and eventual yield of crops, e.g., moisture, soil quality, plant nutrition including micronutrients, genetics, and ambient temperatures all play roles in determining grain and biomass development. It has been found that insufficient micronutrients can significantly lessen yields, particularly insufficient amounts of Zn, Mn, and Cu.

It has also been known to coat wheat seeds with nutrient-bearing coating vehicles. See, e.g., Scott et al., *Effect of Nutrient Seed Coating on the Emergence of Wheat and Oats*, Fertilizer Research: 205-217 (1987). Some coatings, such as dicalcium phosphate dihydrate, increase early dry matter production and phosphorous (P) uptake. It has also been suggested that synthetic resin polymers may be applied to seeds to good effect, as disclosed in U.S. Pat. No. 6,753,395.

There is accordingly a need in the art for improved coatings specifically designed for application to seeds in order to increase crop yields.

SUMMARY OF THE INVENTION

The present invention overcomes the problems outlined above and provides novel seed coatings having particular amounts of useful micronutrients, and especially Zn, Mn, and Cu. Advantageously, the coatings comprise an aqueous dispersion or solution of anionic carboxylate polymers containing maleic and itaconic repeat units together with micronutrients. The micronutrients may be chemically bound to the polymers, complexed therewith, or simply present along with the polymers. Preferably, the micronutrients are directly bonded or complexed with the polymer backbone and the micronutrient package consists essentially of, or consists of, Zn, Mn, and Cu. Optionally, one or more plant growth regulators may also be used with the polymers.

The polymers are normally synthesized via free radical polymerization to yield the free acid forms thereof, and are then reacted with compounds (e.g., salts) of Zn, Mn, and Cu in order to yield partial salt forms of the polymer in aqueous dispersion with an acidic pH, preferably a pH of from about 3-8, more preferably from about 4-6.5; in some instances, pure metals may be used in lieu of the metal compounds. These polymers may be directly applied to seeds by spraying, dipping, or any other convenient technique, and allowed to dry thereon, such that the final seed product has the dried residue of the polymer on the surfaces thereof.

DETAILED DESCRIPTION OF THE PREFERRED EMBODIMENT

The polymers of the invention provide micronutrients which improve plant growth and yields. Preferably, the polymers are polyanionic, and especially dicarboxylic, and contain maleic and itaconic repeat units supplemented with Zn, Mn, and Cu micronutrients.

The Polyanionic Polymers

Generally speaking, the polymers of the invention should have a molecular weight of about 500-5,000,000, more preferably from about 1500-50,000, and contain at least three and preferably more repeat units per molecule (preferably from about 10-500). Moreover, the partial or complete salts of the polymers should be water dispersible and preferably water soluble, i.e., they should be dispersible or soluble in pure water to a level of at least about 5% w/w at room temperature with mild agitation.

Advantageously, at least about 50% (by mole) of repeat units contain at least 1 carboxylate group. These species also are typically capable of forming stable solutions in pure water up to at least about 20% w/w solids at room temperature.

To summarize, the preferred polymers of the invention have the following characteristics:

- The polymers should be dispersible and more preferably fully soluble in water.
- The polymers should have a significant number of anionic functional groups, preferably at least about 90 mole percent by weight, more preferably at least about 96 mole percent by weight, and most preferably the polymers are essentially free of non-anionic functional groups.
- The polymers are stable thermally and chemically for convenient use.
- The polymers should be essentially free of ester groups, i.e., no more than about 5 mole percent thereof, and most preferably no more than about 1 mole percent.
- The polymers should have only a minimum number of amide-containing repeat units, preferably no more than about 10 mole percent thereof, and more preferably no more than about 5 mole percent.
- The polymers should have only a minimum number of monocarboxylate repeat units, preferably no more than about 10 mole percent thereof, and more preferably no more than about 5 mole percent.

The ensuing detailed description of preferred polymers makes use of the art-accepted term "repeat units" to identify the repeat units in the polymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

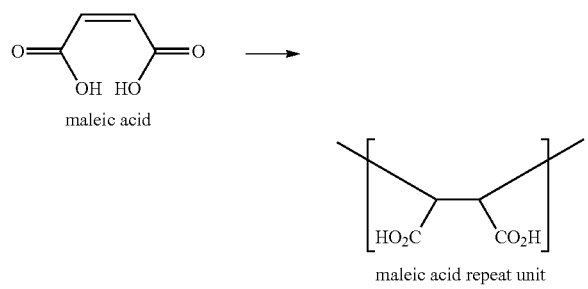

Different monomers within a given polymerization mixture are converted to corresponding repeat units, which bond to each other in various ways depending upon the nature of the repeat groups and the polymerization reaction conditions, to create the final polymer chain, apart from end groups.

In carrying out the invention, it has been determined that certain specific families or classes of polymers are particularly suitable. These are described below as "Class I," "Class IA," and "Class II" polymers. Of course, mixtures of these polymer classes are also contemplated.

Class I Polymers

The Class I polyanionic polymers of the present invention are at least tetrapolymers, i.e., they are composed of at least four different repeat units individually and independently selected from the group consisting of type B, type C, and type G repeat units, and mixtures thereof, described in detail below. However, the Class I polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred Class I polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred Class I polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G).

The Class I polymers are easily converted to partial or fully saturated salts by a simple reaction with an appropriate salt-forming cation compound. Usable cations can be simple cations such as sodium, but more complex cations can also be used, such as cations containing a metal atom and other atom(s) as well, e.g., vanadyl cations. Among preferred metal cations are those derived from alkali, alkaline earth, and transition metals. The cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine. These possible secondary cations should be reacted with no more than about 10 mole percent of the repeat units of the polymer.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B repeat units in the Class I polymers of the invention should range from about 1-70 mole percent, more preferably from about 20-65 mole percent, and most preferably from about 35-55 mole percent, where the total amount of all of the repeat units in the Class I polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class I polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof)

with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class I polymers of the invention should range from about 0.1-65 mole percent, more preferably from about 1-35 mole percent, and most preferably from about 1-25 mole percent, where the total amount of all of the repeat units in the Class I polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction.

Further Preferred Characteristics of the Class I Polymers

As noted previously, the total abundance of type B, C, and G repeat units in the Class I polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the Class I polymers of the invention contain no more than about 10 mole percent of any of (I) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units, namely less that about 55 by weight in the repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred Class I polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred Class I polymers of the invention should have a very high percentage of the repeat units thereof bearing at least one anionic group, e.g., at least about 80 mole percent, more preferably at least about 90 mole percent, and most preferably at least about 95 mole percent. It will be appreciated that the B and C repeat units have two anionic groups per repeat unit, whereas the preferred sulfonate repeat units have one anionic group per repeat unit.

For a variety of applications in accordance with the invention, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers in accordance with the invention is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

Especially preferred Class I polymers for use in the invention are synthesized as partial Zn, Mn, and Cu combined salts and include the following repeat units: maleic—from about 20-55 mole percent, more preferably from about 25-50 mole percent, and most preferably from about 30-45 mole percent; itaconic—from about 35-65 mole percent, more preferably from about 40-60 mole percent, and most preferably about 50 mole percent; total sulfonated—from about 2-40 mole percent, more preferably from about 3-25 mole percent, and most preferably from about 5-20 mole percent. The total sulfonated fraction is preferably made up of a combination of methallylsulfonic and allylsulfonic repeat units, namely, methallylsulfonic—from about 1-20 mole percent, more preferably from about 3-15 mole percent, and most preferably from about 4-6 mole percent, and allylsulfonic—from about 0.1-10 mole percent, more preferably from about 0.5-8 mole percent, and most preferably from about 1-5 mole percent. These partial salts should have a pH within the range of from about 3-8, more preferably from about 4-6.5.

One preferred polymer of this type has a repeat unit molar composition of maleic 45 mole percent, itaconic 50 mole percent, methallylsulfonic 4 mole percent, and allylsulfonic 1 mole percent. This specific polymer is referred to herein as the "T5" polymer, and would be synthesized as or converted to the desired Zn, Mn, and Cu combined partial salt.

Another type of preferred polymer is a "T-20" tetrapolymer containing about 30 mole percent maleic repeat units, about 50 mole percent itaconic repeat units, and a total of about 20 mole percent sulfonated repeat units, made up of about 15 mole percent methallylsulfonate repeat units and about 5 mole percent allylsulfonate repeat units. The T-20 polymer would be synthesized as or converted to the desired Zn, Mn, and Cu combined partial salt.

Syntheses of the Class I Polymers

Virtually any conventional method of free radical polymerization may be suitable for the synthesis of the Class I polymers of the invention. However, a preferred and novel synthesis may be used, which is applicable not only for the production of the Class I polymers of the invention, but also for the synthesis of polymers containing dicarboxylate repeat units and sulfonate repeat units and preferably containing at least one carbon-carbon double bond.

Generally speaking, the new synthesis methods comprise carrying out a free radical polymerization reaction between dicarboxylate and sulfonate repeat units in the presence of hydrogen peroxide and vanadium-containing species to achieve a conversion to polymer in excess of 90%, and more preferably in excess of 98%, by mole. That is, a dispersion of the dicarboxylate and sulfonated monomers is created and free radical initiator(s) are added followed by allowing the monomers to polymerize.

Preferably, the hydrogen peroxide is the sole initiator used in the reaction, but in any case, it is advantageous to conduct the reaction in the absence of any substantial quantities of other initiators (i.e., the total weight of the initiator molecules used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these polymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred polymerization reactions may be carried out without the use of inert atmospheres, e.g., in an ambient air environment. As is well known in the art, free radical polymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the polymerizations, and can present safety hazards. However, in the polymerizations of the polymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes-24 hours (more preferably from about 1-5 hours) in an amount effective to achieve polymerization. This process is commonly carried out in a stirred tank reactor equipped with facilities for controlling temperature and composition, but any suitable equipment used for polymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the polymerization; indeed, the initially undissolved fraction of monomers will dissolve at some time after polymerization has been initiated.

After the initial heating and introduction of monomers, the reactor contents are maintained at a temperature between about 80-125° C., with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to polymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slow or impractically diluted. On the high end, the concentration should not cause difficulties in performing the polymerization safely in the equipment being used.

Preferably, the polymerization reactions of the invention are carried out to exclude substantial amounts of dissolved iron species (i.e., more than about 5% by weight of such species, and more preferably substantially less, on the order of below about 5 ppm, and most advantageously under about 1 ppm). This is distinct from certain prior techniques requiring the presence of iron-containing materials. Nonetheless, it is acceptable to carry out the polymerization of the invention in 304 or 316 stainless steel reactors. It is also preferred to exclude from the polymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final polymers, which either must be separated or left as a product contaminant.

The high polymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished polymers in a single reactor. This is further augmented by the fact that the polymers are formed first, and subsequently, if desired, partial or complete salts can be created.

EXAMPLES

The following examples describe preferred synthesis techniques for preparing polymers; it should be understood, however, that these examples are provided by way of illustration only and nothing therein should be taken as a limitation on the overall scope of the invention. It will further be understood that the following Examples relate to synthesis of the stating polymers, which are then converted to partial Zn, Mn, and Cu combined salts for use as seed coatings.

Example 1

Exemplary Synthesis

Apparatus:
A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:
maleic: 45%
itaconic: 35%
methallylsulfonate: 15%
allylsulfonate: 5%

When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting polymer dispersion was found to have less than 2% w/w total of residual monomers as determined by chromatographic analysis.

Example 2

Exemplary Synthesis

Apparatus:
Same as Example 1

Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:
maleic: 45%
itaconic: 50%
methallylsulfonate: 4%
allylsulfonate: 1%

When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting polymer dispersion was found to have less than 1% w/w total of residual monomers as determined by chromatographic analysis.

Example 3

Preparation of Tetrapolymer Partial Salts

A tetrapolymer calcium sodium salt dispersion containing 40% by weight polymer solids in water was prepared by the preferred free radical polymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were polymerized in the reaction.

The resultant polymer is then conventionally reacted with appropriate Zn, Mn, and Cu sources in order to create a final partial salt polymer having the desired pH and metal contents for use as seed coatings.

Example 4

Exemplary Synthesis

A terpolymer salt dispersion containing 70% by weight polymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride—20%; itaconic acid—60%; methallylsulfonate sodium salt—20%. When the monomers were initially added, they were in suspension in the water. As the temperature rose, the monomers became more fully dissolved before polymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush polymerization"; the initially undissolved monomers were subsequently dissolved during the course of the reaction.

The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting polymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to polymer.

This polymer is then conventionally reacted with Zn, Mn, and Cu salts in order to yield the partial salt polymers of the invention, at the appropriate pH levels.

Class IA Polymers

Class IA polymers contain both carboxylate and sulfonate functional groups, but are not the tetra- and higher order polymers of Class I. For example, terpolymers of maleic, itaconic, and allylsulfonic repeat units, which are per se known in the prior art, will function as the polyanionic polymer component of the compositions of the invention. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and are converted to the desired partial Zn, Mn, and Cu combined salts, as described previously.

Class II Polymers

Broadly speaking, the polyanionic polymers of this class are of the type disclosed in U.S. Pat. No. 8,043,995, which is incorporated by reference herein in its entirety. The polymers include repeat units derived from at least two different monomers individually and respectively taken from the group consisting of what have been denominated for ease of reference as B' and C' monomers; alternately, the polymers may be formed as homopolymers or polymers from recurring C' monomers. The repeat units may be randomly distributed throughout the polymer chains.

In detail, repeat unit B' is of the general formula

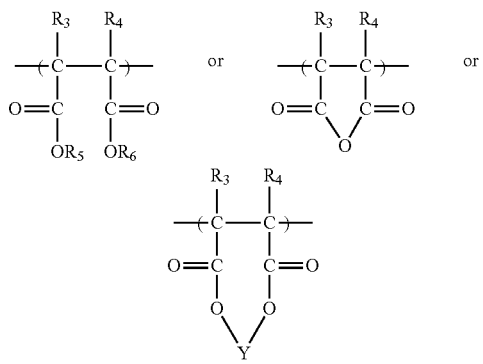

and repeat unit C' is of the general formula

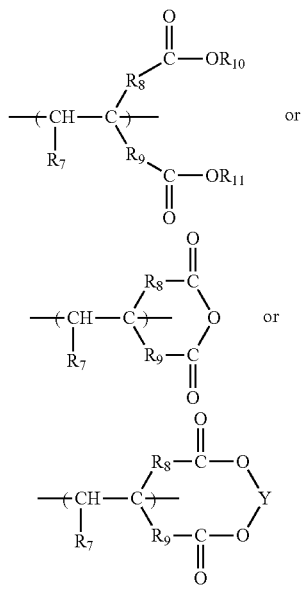

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, $R'CO_2$ groups, $OR'$ groups and COOX groups, wherein R' is selected from the group consisting of $C_1$-$C_{30}$ straight, branched chain and cyclic alkyl or aryl groups and X is selected from the group consisting of H, the alkali metals, $NH_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., $VO^{+2}$), amines, and mixtures thereof; and $R_8$ and $R_9$ are individually and respectively selected from the group consisting of nothing (i.e., the groups are non-existent), $CH_2$, $C_2H_4$, and $C_3H_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, $NH_4$, and the $C_1$-$C_4$ alkyl ammonium groups. This particular Class II polymer is sometimes referred to as a butanedioic methylenesuccinic acid polymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the present invention. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging for example from 500-5,000,000, depending chiefly upon the desired end use. Additionally, n can range from about 1-10,000 and more preferably from about 1-5,000.

Preferred Class II polymers are usually synthesized using dicarboxylic acid monomers, as well as precursors and derivatives thereof. For example, polymers containing mono and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with salt-forming cations using conventional methods and reactants.

Synthesis of the Class II Polymers of the Invention

In general, the Class II polymers are made by free radical polymerization serving to convert selected monomers into the desired polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

After the polymerization reaction is complete, the Class II polymers are converted to the Zn, Mn, and Cu combined partial salts at the appropriate pH levels.

Preferred Class II Maleic-Itaconic Polymers

The most preferred Class II polymers are composed of maleic and itaconic B' and C' repeat units and have the generalized formula

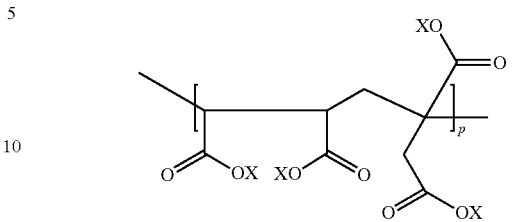

where X is either H or another salt-forming cation, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

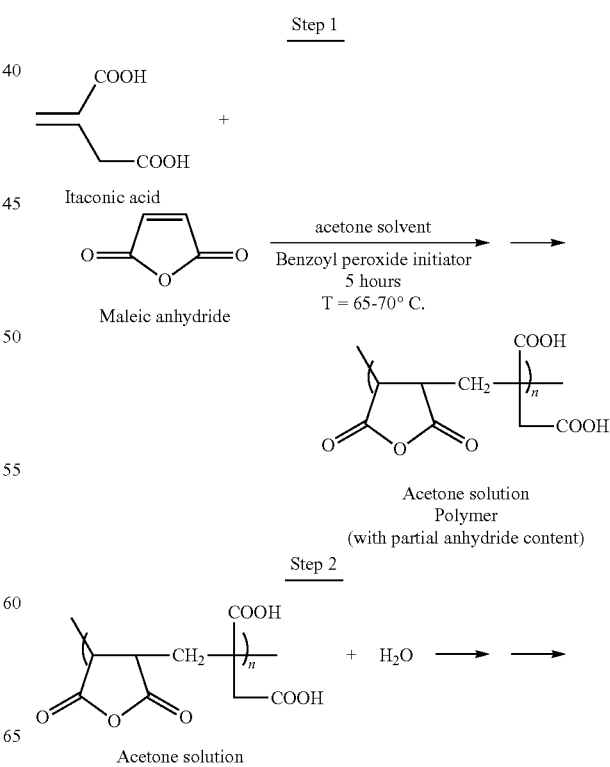

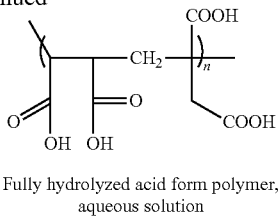

Fully hydrolyzed acid form polymer, aqueous solution

Once again, the Class II polymers should have the same preferred characteristics as those of the Class I and Class IA polymers set forth above, after conversion to the Zn, Mn, and Cu combined partial salts.

Preferred Micronutrient Compositions

As noted previously, the preferred polymers of the invention include respective amounts of Zn, Mn, and Cu micronutrients. Thus, one type of micronutrient-supplemented polymer in accordance with the invention includes from about 0.1-12% by weight of Zn, more preferably from about 1-9% by weight Zn, and most preferably from about 2-6% by weight Zn. Additionally, these polymers should include from about 0.1-7.5% Mn, more preferably from about 0.8-4.5% by weight Mn, and most preferably from about 1-3% by weight Mn. Cu is preferably present at a level of from about 10-1500 ppm, more preferably from about 100-1400 ppm, and most preferably from about 600-1200 ppm. All of the foregoing ranges are based upon the weight percentages of Zn, Mn, and Cu as the corresponding micronutrient metals per se, and not in terms of compounds containing the micronutrients. Na is also preferably present in the polymers, derived from sodium hydroxide, at variable levels depending upon the pH of the product. The Zn, Mn, and Cu micronutrients are chemically bound directly to the backbone of the polymer.

Polymer formulations having different concentrations of micronutrients may be used in practicing the invention. For example, an aqueous polymeric composition may be provided which is designed for application at a rate of 6 oz of the liquid per 100 lbs of seed, in which case the concentration of the micronutrients would be on the low side of the listed ranges. Alternately, a more concentrated polymeric composition may be formulated for application at a rate of 2 oz of the liquid per 100 lbs of seed. In this instance, the micronutrient concentrations would be towards the high end of the ranges. The latter more concentrated compositions would also be designed for mixing with other plant protection products.

In preparative procedures, the acid form of the polymers are conventionally synthesized as aqueous dispersions or solutions, and the Zn, Mn, and Cu micronutrients are reacted with the synthesized polymer so as to cause the micronutrients to chemically bond with or complex to the polymer to create the desire partial salts. Normally, compounds of Zn, Mn, and Cu are used, e.g., the oxide, carbonate, or sulfate compounds. Sodium hydroxide is also added to achieve the desired pH.

As noted previously, the compositions of the invention are advantageously in the form of aqueous polymeric dispersions of acid pH and with a polymer content of from about 30-60% by weight, more preferably from about 35-55% by weight. In particularly preferred forms, the compositions have a pH of from about 5.8-6.2. Zn is present at a level of about 2% by weight, Mn is present at a level of about 1% by weight, and Cu is present at a level of about 200 ppm; all of these amounts are on a w/w, metals basis. Zn is derived form zinc carbonate, whereas the Mn is derived from manganese sulfate, and the Cu is derived from copper oxide. The Na is derived from sodium sulfate. The composition also includes a minor about of propylene glycol at 5% w/w and from about 45-55% w/w of water.

The polymers of the invention are useful with virtually all kinds of agricultural seeds and particularly wheat, corn, soybean, cotton, and rice. For example, the polymers can be used with essentially all wheat varieties and hybrids, including, without limitation, the following and all subvarieties thereof:

| | | | |
|---|---|---|---|
| 2137 | Aspen | Cougar | Hickok |
| 2145 | Avalanche | Culver | Hondo |
| 2154 | Baker's White | Custer | Ike |
| 2157 | Betty | Cutter | Infinity CL |
| 2158 | Big Dawg | Danby | Intrada |
| 2163 | Big Max | Deliver | Jagalene |
| 2165 | Bill | Discovery | Jagger |
| 2172 | Bond CL | Doans | Jules |
| 2174 | Bounty 122 | Dodge | Kalvesta |
| 2180 | Bounty 202 | Dominator | Karl/Karl 92 |
| Abilene | Bounty 205 | Dumas | Keota |
| Above | Bounty 301 | Duster | Kleopatra Red |
| Advantage | Bronco | Eagle | Kleopatra White |
| Agseco 7805 | Brule | Endurance | Kojak |
| Agseco 7833 | Buckskin | Enhancer | Lakin |
| Agseco 7837 | OK Bullet | Fannin | Lamar |
| Agseco 7846 | Burchett | Fuller | Lancota |
| Agseco 7853 | Carson | G1878 | Laredo |
| Agseco 9001 | Centerfield | Garst HR48 | Larned |
| Alliance | Centura | Garst HR64 | Lockett |
| Akron | Centurk/Centurk 78 | Gem | Longhorn |
| Ankor | Century | Grazit | Mankato |
| AP502CL | Champ | Guymon | Mesa |
| AP7301 | Chisholm | Hallam | Millennium |
| AP7501 | Cimarron | Halt | Mustang |
| AP7510 | Cisco | Harry | Nekota |
| AP7601 | Cody | Hatcher | Neosho |
| Arapahoe | Colby 94 | Haven | Newton |
| Arkan | Colt | Hawk | Niobrara |
| Arlin | Coronado | Hawken | Norkan |
| Art | Cossack | Heyne | NuDakota |
| NuFrontier | Quantum 574 | Sturdy 2K | TAM 302 |
| NuGrain | Quantum 577 | T67 | TAM 304 |
| NuHills | Quantum 578 | T81 | TAM 400 |
| NuHorizon | Quantum 579 | T81SV | Tarkio |
| Nuplains | Quantum 588a | T812 | Thunderbird |
| Ogallala | Quantum 589 | T83 | Thunderbolt |
| Ok101 | Quantum 7406 | T834 | Tomahawk |
| Ok102 | Quantum 7460 | T111 | Tonkawa |
| Okfield | Ram | T113G | Trailblazer |
| Onaga | Rawhide | T118 | Trego |
| Oro Blanco | Redland | T129 | Triumph/Triumph 64 |
| Overland | Rio Blanco | T136 | Tut |
| Overley | Ripper | T140 | Venango |
| Payne | Rocky | T193 | Victory |
| Pecos | RonL | T213 | Vista |
| Plainsman V | Rowdy | T91 | Vona |
| Platte | Sage | TAM W 101 | Voyager |
| Ponderosa | Salute | TAM 105 | Wahoo |
| Pony | Sandy | TAM 107 | Weathermaster 135 |
| Postrock | Santa Fe | TAM 108 | Wesley |
| Prairie Red | Scout | TAM 109 | Windstar |
| Prairie White | Sierra | TAM 110 | Wings |
| ProBrand 830 | Siouxland/Siouxland 89 | TAM 111 | Winterhawk |
| Protection | Shocker | TAM 112 | Wrangler |
| Prowers/Prowers 99 | Smoky Hill | TAM 200 | Yuma |
| Prowers 99 | Stallion | TAM 202 | Yumar |
| Quantum 561 | Stanton | TAM 203 | |
| Quantum 562 | Sturdy | TAM 301 | |

See, http://www.thewheatfarmer.com/varieties_list.shtm.

The polymers of the invention may also include plant growth regulators. These may be present in a variety of amounts depending upon the type of regulator and the intended use. The regulators are typically added after the polymers are synthesized and supplemented with micronutrients. Depending upon the charge of the plant growth regulators, they may be bonded or complexed with the polymer or present in the polymer/aqueous medium. For example, cationic or amphoteric plant growth regulators tend to bond or complex with the polymer, whereas anionic species do not.

Typical plant growth regulators which can be used with the polymers of the invention include one or more of the following regulators:

Antiauxins: clofibric acid, 2,3,5-tri-iodobenzoic acid;

Auxins: 4-CPA, 2,4-D, 2,4-DB, 2,4-DEP, dichloroprop, fenoprop, IAA, IBA, naphthaleneacetamide, a-naphthaleneacetic acids, 1-naphthol, naphthoxyacetic acids, potassium naphthenate, sodium naphthenate, 2,4,5-T;

Cytokinins: 2iP, benzyladenine, 4-hydroxyphenethyl alcohol, kinetin, zeatin;

Defoliants: calcium cyanamide, dimethipin, endothal, ethephon, merphos, metoxuron, pentachlorophenol, thidiazuron, tribufos;

Ethylene Inhibitors: aviglycine, 1-methylcyclopropene;

Ethylene Releasers: ACC, etacelasil, ethephon, glyoxime;

Gametocides: fenridazon, maleic hydrazide;

Gibberellins: gibberellins, gibberellic acid;

Growth Inhibitors: abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid Morphactins: chlorfluren, chlorflurenol, dichlorflurenol, flurenol);

Growth Retardants: chlormequat, daminozide, flurprimidol, mefluidide, paclobutrazol, tetcyclacis, uniconazole;

Growth Stimulators: brassinolide, brassinolide-ethyl, DCPTA, forchlorfenuron, gamma-aminobutyric acid, hymexazol, prosuler, pyripropanol, triacontanol;

Signalling Agents $Ca^{2+}$, inositol phospholipids, G-proteins, cyclic nucleotides, protein kinases, protein phosphatases, sodium glutamate;

Unclassified Plant Growth Regulators: bachmedesh, benzofluor, buminafos, carvone, choline chloride, ciobutide, clofencet, cloxyfonac, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac.

The complete micronutrient-supplemented polymers of the invention, with or without the inclusion of plant growth regulators, may be applied to seeds by any convenient means, such as spraying or dipping. In terms of amounts, the polymers should be used at a level of from about 0.1-25 oz, more preferably from about 2-7 oz and most preferably about 6 oz, per 100 lbs of seed. These ranges refer to the preferred aqueous polymer mixtures containing about 40% by weight polymer. Therefore, these ranges translate to from about 0.04-10 ounces micronutrient polymer per 100 lbs of wheat seed, more preferably from about 0.8-2.8 ounces and most preferably about 2.4 ounces.

Examples

The tested polymer product was the presently most preferred product made up of a 40% solids aqueous polymer partial salt mixture wherein the polymer fraction contained substantially equimolar amounts of maleic and itaconic repeat units. The polymer mixture included about 2% by weight Zn, about 1% by weight Mn, and about 200 ppm of Cu, on a metals basis. In addition, the aqueous polymer mixture as prepared included sufficient sodium hydroxide to give the overall mixture a pH of about 6. The density of the polymer mixture was about 11.1 lbs/gallon.

This micronutrient-supplemented aqueous polymer mixture was applied by spraying onto wheat seed, followed by allowing the mixture to dry so that the dried residue of the mixture was applied to the wheat seed surfaces. The treated wheat products were then tested to determine the yield advantage provided by the test polymer. In each case, the test wheat seeds were treated at a rate of either four or six ounces of the aqueous polymer mixture per 100 lbs of seed, and untreated control seeds were planted along with the coated seeds. Yields were calculated as bushels per acre.

TABLE A

| Crop | Rate | Yield | Yield Advantage | Location |
| --- | --- | --- | --- | --- |
| Wheat | Control | 77.8 | c | Manhattan, KS |
| Wheat | 4 oz | 83.6 | 5.8 | |
| Wheat | 6 oz | 83.6 | 6.7 | |
| Wheat | 4 oz | 81.0 | 5.8 | |
| Wheat | 6 oz | 84.5 | 3.2 | |

TABLE B

| Crop | Rate | Yield | Yield | Location |
| --- | --- | --- | --- | --- |
| Wheat | Control | 83.5 | c | Clemson, SC |
| Wheat | 4 oz | 83.8 | 0.3 | |
| Wheat | 6 oz | 85.1 | 1.6 | |
| Wheat | 8 oz | 86.5 | 3.0 | |

A series of controlled, directly comparative tests were undertaken with various varieties of corn, wherein the most preferred product described above was employed.

In one such test, four corn hybrids (Croplan 2123VT2P/RIB, DKC 30-23, INT 9333VT2PRO/RIB, and Pioneer P8210HR) were tested under identical field and growth conditions. For each hybrid, there were four control trials without seed coating and four coated trials seed trials where the polymer product was applied to the seed at a level of 6 oz per 100 lbs of seed. At the conclusion of the test, the results were averaged, giving the following data:

TABLE C

| Hybrid | Treatment | Average Yield (Bu/acre) |
| --- | --- | --- |
| CL 2123 | Control | 108.1 |
| CL 2123 | Polymer Coated | 135.97 |
| INT 9333 | Control | 130.45 |
| INT 9333 | Polymer Coated | 141.85 |
| P8210 | Control | 107.2 |
| P8210 | Polymer Coated | 120.99 |
| 30-23 | Control | 111.28 |
| 30-23 | Polymer Coated | 115.15 |

In another directly comparative test, the amount of polymer product was varied to determine the yield effect. In particular, the corn hybrid was DKC-64-69, and yield tests were performed using a non-coated control, and the most preferred polymer product at levels of 4 and 6 oz per 100 lbs of seed. In this study, the control gave a yield of 155.1 Bu/acre, the 4 oz trial gave a yield of 156.8 Bu/acre, and the 6 oz trial gave a yield of 164.8 Bu/acre.

It has also been found that the compositions of the invention are effective for reducing nematode infestations, such as soybean cyst nematodes (*Heterodera glycine*), which are parasitic to soybean plants (*Glycine Max*). These nematodes damage soybean root structure and decrease yields in the US by nearly 1 billion dollars per year. These nematode infestations are difficult to identify and control, even with the use of nematocides and crop rotations.

Five field trials were undertaken at diverse locations throughout the Midwest to cover a variety of geographies and soil types. Within each trial, four replications were completed, and each replication was sampled for nematode cysts consisting of 6-8 consolidated soil cores. The samples were analyzed for cyst nematode eggs per 100 cc of solution, using a standard assay.

In the test, untreated seeds were planted along with seeds coated with the preferred composition of the invention, applied at a rate of 6.0 fluid ounces of the composition per 100 pounds of seed. A dry formulation containing the polymer was applied to a third quantity of seeds at a rate of 3.76 ounces of the dry material per 100 pounds of seed.

The seed treatment unexpectedly reduced soybean cyst nematode (SCN) egg counts significantly, compared to the untreated control. The following summarizes the test data:

TABLE D

| Average of 5 Test Sites, 4 Replications/Site | SCN eggs per 100 cc |
|---|---|
| Untreated Control Seeds | 975 |
| Treated Seeds - Aqueous Composition | 525 |
| Treated Seeds - Dry Composition | 663 |

Further disclosure pertaining to the Class I polymers and uses thereof is set forth in U.S. patent application Ser. No. 62/001,110, filed May 21, 2014, which is fully incorporated by reference herein.

I claim:

1. A water soluble coating composition for seeds, comprising a polymer having a backbone containing maleic, itaconic, and sulfonate repeat units and having micronutrients consisting of Zn, Mn, and Cu, wherein Zn, Mn, and Cu are the only micronutrients present in the coating composition, wherein said polymer comprises at least about 50% by mole repeat units containing at least one carboxylate group, wherein said polymer is in a partial Zn, Mn, Cu combined salt form, and wherein said coating composition has a polymer content of from about 35% to about 55% by weight based on the total weight of the coating composition.

2. The coating composition of claim 1, said micronutrients being chemically bound to said polymer backbone.

3. The coating composition of claim 1, said coating composition being an aqueous mixture containing said polymer.

4. The coating composition of claim 3, said mixture having a pH of from about 3-8.

5. The coating composition of claim 4, said mixture having a pH of from about 4-6.5.

6. The coating composition of claim 1, said polymer having at least four different repeat units therein.

7. The coating composition of claim 1, said polymer having at least 80 mole percent of repeat units including at least one anionic group.

8. A method of treating seeds comprising the step of coating seeds with the coating composition of claim 1.

9. The method of claim 8, said seeds are selected from the group consisting of wheat and corn.

10. A method of treating seeds comprising the step of coating seeds with the coating composition of claim 3.

11. The method of claim 10, said coating being applied by spraying the composition onto said seeds, or by dipping the seeds in the composition.

12. A seed product comprising a seed having on the surface thereof the coating composition of claim 1.

13. The seed product of claim 12, wherein said seed is selected from the group consisting of wheat and corn.

14. A water soluble coating composition for seeds, comprising a polymer composition including an anionic polymer comprising at least four repeat units distributed along a length of a polymer chain, said at least four repeat units including at least one each of a maleic, itaconic, and sulfonate repeat unit, and said composition having Zn, Mn, and Cu as the only micronutrients therein, wherein said polymer comprises at least about 50% by mole repeat units containing at least one carboxylate group, wherein said polymer is in a partial Zn, Mn, Cu combined salt form, and wherein said coating composition has a polymer content of from about 30% to about 60% by weight based on the total weight of the coating composition.

15. The coating composition of claim 14, said micronutrients being chemically bound to the backbone of said polymer.

16. The coating composition of claim 14, said composition being an aqueous mixture.

17. The coating composition of claim 16, said aqueous mixture having a pH of from about 3-8.

18. A method of treating seeds comprising the step of coating said seeds with the coating composition of claim 14.

19. A seed product comprising seeds having on the surface thereof the coating composition of claim 14.

20. The seed product of claim 19, said seeds selected from the group consisting of wheat and corn.

21. A method of controlling nematodes comprising the step of introducing a water soluble polymer into a region of nematode infestation, said polymer including a polymer backbone containing maleic, itaconic, and sulfonate repeat units and having Zn, Mn, and Cu as the only micronutrients therein, wherein said polymer comprises at least about 50% A by mole repeat units containing at least one carboxylate group, wherein said polymer is in a partial Zn, Mn, Cu combined salt form, and wherein said coating composition has a polymer content of from about 30% to about 60% by weight based on the total weight of the coating composition.

22. The method of claim 21, said micronutrients being chemically bound to said polymer backbone.

23. The method of claim 21, said polymer-introduction steps comprising the step of applying the polymer to the surfaces of seeds, and planting the seeds into said region.

24. The composition of claim 1, said polymer having about 0.1%-12% by weight Zn, about 0.1%-7.5% Mn, and about 10-1500 ppm Cu present, wherein these percentages are based on the total weight of the polymer.

25. The composition of claim 1, said sulfonate repeat units comprising allylsulfonic repeat units, methallylsulfonic repeat units, or a combination thereof.

26. The composition of claim 25, said polymer having about 1-20 mole percent methallylsulfonic repeat units and about 0.1-10 mole percent allylsulfonic repeat units.

27. A coating composition for seeds, consisting of a polymer having a backbone containing maleic, itaconic, and sulfonate repeat units and having micronutrients consisting of Zn, Mn, and Cu, said polymer being in a Zn, Mn, and Cu combined partial salt form, and wherein said coating composition has a polymer content of from about 35% to about 55% by weight based on the total weight of the coating composition.

28. The composition of claim 1, said polymer having two sulfonate repeat units.

29. The composition of claim 1, said polymer having about 2%-6% by weight Zn, about 0.8-4.5% Mn, and about 100-1400 ppm Cu present, wherein these percentages are based on the total weight of the polymer.

30. The composition of claim 27, said polymer having about 2%-6% by weight Zn, about 0.8-4.5% Mn, and about 100-1400 ppm Cu present, wherein these percentages are based on the total weight of the polymer.

31. The composition of claim 1, wherein the polymer comprises about 20-55 mole percent maleic repeat units, about 35-65 mole percent itaconic repeat units and about 2-40 mole percent sulfonate repeat units.

* * * * *